US009823649B2

(12) United States Patent
Sahadeo et al.

(10) Patent No.: US 9,823,649 B2
(45) Date of Patent: Nov. 21, 2017

(54) VEHICLE BUILD INFORMATION SYSTEM

(71) Applicant: Toyota Motor Engineering & Manufacturing North America, Inc., Erlanger, KY (US)

(72) Inventors: Ricky V. Sahadeo, Cambridge (CA); Nicolae A. Anghel, Kitchener (CA); Jason G. Jakob, Cambridge (CA); Say L. Hoang, Mississauga (CA); Harmeet Ghuman, Campbellville (CA); Timothy B. Schofield, Cambridge (CA); Steven M. Ball, Kitchener (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 328 days.

(21) Appl. No.: 14/633,474

(22) Filed: Feb. 27, 2015

(65) Prior Publication Data
US 2016/0252898 A1 Sep. 1, 2016

(51) Int. Cl.
*G06Q 10/06* (2012.01)
*G06Q 10/08* (2012.01)
*G05B 19/418* (2006.01)

(52) U.S. Cl.
CPC ........ *G05B 19/4183* (2013.01); *G05B 2219/31319* (2013.01); *G05B 2219/32004* (2013.01); *G05B 2219/32128* (2013.01); *G05B 2219/45067* (2013.01); *Y02P 90/04* (2015.11); *Y02P 90/10* (2015.11)

(58) Field of Classification Search
CPC .... G06Q 10/06; G06Q 10/08; G06Q 30/0621; B60R 25/24

USPC ............... 700/95, 99, 115, 116, 117
See application file for complete search history.

(56) References Cited

U.S. PATENT DOCUMENTS

| | | | |
|---|---|---|---|
| 6,631,606 B2 | 10/2003 | Lawton et al. | |
| 7,093,756 B2 | 8/2006 | Muehl et al. | |
| 7,515,981 B2 | 4/2009 | Ryznar et al. | |
| 7,747,340 B2 | 6/2010 | Jones | |
| 2002/0198618 A1* | 12/2002 | Madden | B62D 65/02 700/101 |
| 2004/0225390 A1* | 11/2004 | Keller | G06Q 10/06 700/95 |

(Continued)

FOREIGN PATENT DOCUMENTS

DE 102007040289 A1 2/2009

*Primary Examiner* — Michael J Brown
(74) *Attorney, Agent, or Firm* — Christopher G. Darrow; Darrow Mustafa PC

(57) ABSTRACT

A system and methods for vehicle build information management in an assembly plant are disclosed. Once example method includes receiving, from a first information source, identification information for at least one vehicle being assembled in the vehicle assembly plant. The method further includes receiving, from a second information source, build instructions describing at least one work process to be performed for the at least one vehicle. The method further includes receiving, from a third information source, inventory information identifying a plurality of components required to comply with the build instructions. Finally, the method further includes sending for display, to a user interface, a visual representation of at least two of the identification information and the build instructions and the inventory information.

20 Claims, 8 Drawing Sheets

(56) References Cited

U.S. PATENT DOCUMENTS

2011/0178627 A1    7/2011    Wechter et al.

* cited by examiner

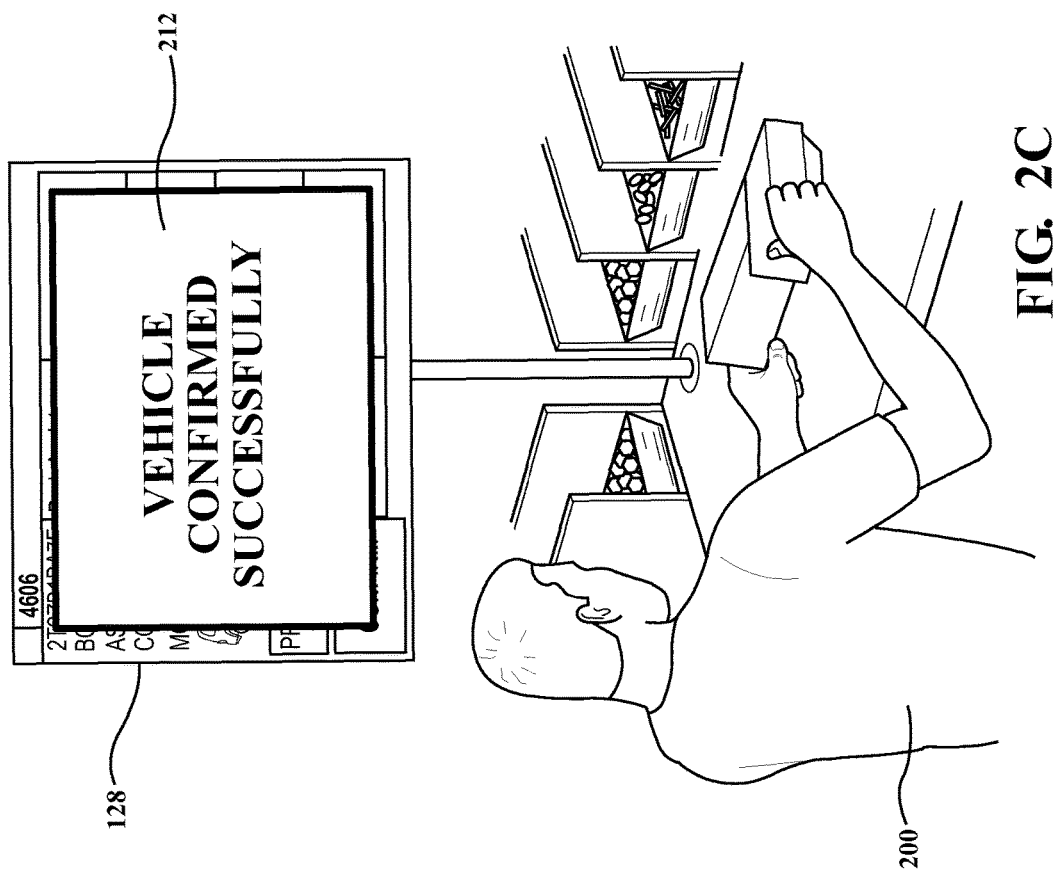

VEHICLE BUILD INFORMATION SYSTEM

BACKGROUND

The assembly process for automotive vehicles includes a variety of manual work processes to be performed by workers at various assembly stations positioned along an assembly line. Each vehicle family manufactured on the assembly line can be designed with various powertrain options, body styles, trim levels, accessories, or other features that drive different components and different work processes. The individual options or components for a given vehicle can be based, for example, on an order received from an automotive dealer planning to sell a vehicle with a specific set of options through a vehicle sales system.

Given the unique options and components possible for a vehicle family, each vehicle being built on the assembly line requires its own set of build instructions containing information regarding the work processes that need to be performed at the various assembly stations. The build instructions are historically stored within a vehicle build system. The build instructions are then printed and attached to the vehicle for reference at each assembly station.

A complete list of components to be installed according to the build instructions is also required for each vehicle, for example, in the form of a build sheet. A plant inventory system designed to keep track of the components needed for each vehicle can store multiple build sheets identifying the components to be installed in various vehicles traveling the assembly line. Historically, each build sheet was also printed and attached to a vehicle for use in identifying the components to be installed according to the build instructions.

Assembly plants also include a vehicle location system which can identify the position of each vehicle within the assembly plant, for example, at one of the assembly stations. A vehicle location system can read a vehicle identification number (VIN) off of the vehicle directly or use a copy of the build instructions or build sheet to identify a vehicle. Each of the above systems, that is, the vehicle sales system, the vehicle build system, the plant inventory system, and the vehicle location system, can provide unique information about a vehicle. However, no system exists to compile the information from these various information sources in a user-friendly manner that assists the plant worker and improves the assembly process.

SUMMARY

A vehicle build information system designed to assist a worker within an assembly plant to complete a work process is disclosed. The vehicle build information system can collect identification information for at least one vehicle being assembled in a vehicle assembly plant, build instructions describing at least one work process to be performed for the at least one vehicle, and inventory information identifying a plurality of components required to comply with the build instructions. Based on this collected information, the vehicle build information system can send for display, to the worker, a visual representation of at least two of the identification information and the build instructions and the inventory information to assist the worker in completing the work process.

In one implementation, a vehicle build information system for an assembly plant is disclosed. The system includes a user interface and a computing device. The computing device includes one or more processors for controlling operations of the computing device and a memory for storing data and program instructions used by the one or more processors. The one or more processors are configured to execute instructions stored in the memory to: receive, from a first information source, identification information for at least one vehicle being assembled in the assembly plant; receive, from a second information source, build instructions describing at least one work process to be performed for the at least one vehicle; receive, from a third information source, inventory information identifying a plurality of components required to comply with the build instructions; and send for display, to the user interface, a visual representation of at least two of the identification information and the build instructions and the inventory information.

In another implementation, a vehicle build information management method is disclosed. The method includes receiving, from a first information source, identification information for at least one vehicle being assembled in a vehicle assembly plant. The method further includes receiving, from a second information source, build instructions describing at least one work process to be performed for the at least one vehicle and receiving, from a third information source, inventory information identifying a plurality of components required to comply with the build instructions. The method further includes sending for display, to a user interface, a visual representation of at least two of the identification information and the build instructions and the inventory information.

In another implementation, a computing device is disclosed. The computing device includes one or more processors for controlling operations of the computing device and a memory for storing data and program instructions used by the one or more processors. The one or more processors are configured to execute instructions stored in the memory to: receive, from a first information source, identification information for at least one vehicle being assembled in a vehicle assembly plant; receive, from a second information source, build instructions describing at least one work process to be performed for the at least one vehicle; receive, from a third information source, inventory information identifying a plurality of components required to comply with the build instructions; and send for display, to a user interface, a visual representation of at least two of the identification information and the build instructions and the inventory information.

BRIEF DESCRIPTION OF THE DRAWINGS

The description herein makes reference to the accompanying drawings wherein like reference numerals refer to like parts throughout the several views, and wherein:

FIGS. 2A-2C show an exemplary work process represented on a display according to one aspect of the vehicle build information system of FIG. 1;

DETAILED DESCRIPTION

A vehicle build information system is described herein. A plurality of different information sources within the assembly plant, such as a vehicle location system, a vehicle build system, and a plant inventory system, can provide useful information to a worker to assist the worker in performing a work process. The useful information can include vehicle identification information, build instructions describing the work process, and inventory information identifying components required to comply with the build instructions. Previously, each information source was referenced separately by the worker to complete the work process. In the improved system described herein, the vehicle build information system can send a visual representation of information from at least two of the different information sources to the same display, allowing the worker to complete the work process more quickly and accurately.

Figure 1:
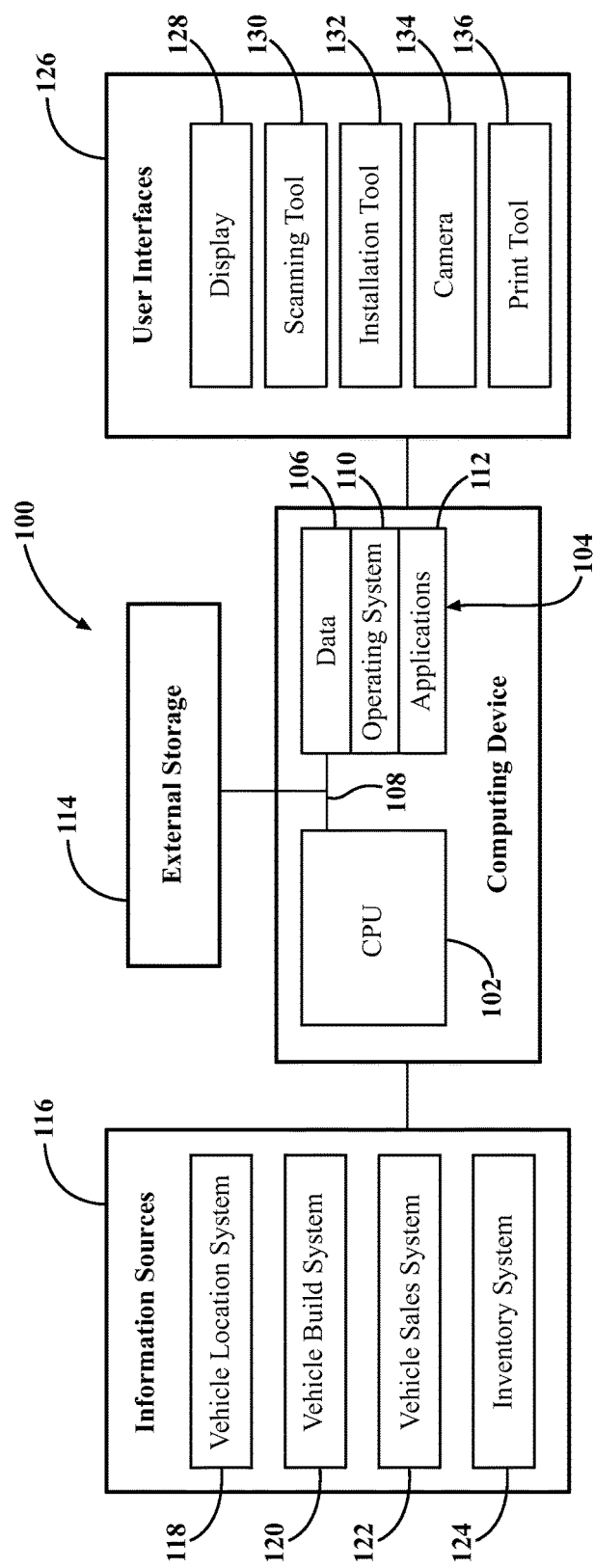
FIG. 1 is a block diagram of a computing device implementing a vehicle build information system.

FIG. 1 is a block diagram of a computing device 100 implementing a vehicle build information system. The computing device 100 can be any type of handheld, desktop, or other form of single computing device, or can be composed of multiple computing devices. The computing device 100 can include a conventional central processing unit (CPU) 102 or any other type of device, or multiple devices, capable of manipulating or processing information, and memory 104. The memory 104 in the computing device 100 can be a random access memory (RAM) device or any other suitable type of storage device. The memory 104 can include data 106 that is accessed by the CPU 102 using a bus 108. The memory 104 can also include an operating system 110 and installed applications 112, the installed applications 112 including programs that permit the CPU 102 to perform the vehicle build information management methods described herein.

The computing device 100 can also include additional or secondary storage 114, for example, a memory card, flash drive, or any other form of computer readable medium. The installed applications 112 can be stored in whole or in part in the secondary storage 114 and loaded into the memory 104 as needed for processing. The computing device 100 can also communicate with a plurality of information sources 116, for example, over a wired or wireless network or using the Internet. These information sources 116 can include legacy systems within an assembly plant and outside systems having information related to new vehicle orders.

For example, the information sources 116 can include a vehicle location system 118. The vehicle location system 118 can read and/or receive identification information associated with a vehicle, such as a VIN or an image of the vehicle, as well determine the physical location of a vehicle within an assembly line of multiple vehicles. For example, the vehicle location system 118 can identify the location within an assembly plant where a vehicle is positioned and provide identification information for other vehicles proximate to that vehicle. Thus, the vehicle location system 118 can supply information about the identity and sequential order of vehicles moving through the assembly line.

The information sources 116 can also include a vehicle build system 120. The vehicle build system 120 can store build instructions that include information regarding the work processes that need to be performed at various assembly stations to construct one or more vehicles within a vehicle family. For example, build instructions can include details regarding the sequential steps or operations required to be performed by a worker at an assembly station to build a subassembly for a vehicle traveling the assembly line. In another example, build instructions can include unique work process information for various vehicle styles within a vehicle family as well as for each assembly station.

The information sources 116 can also include a vehicle sales system 122. The vehicle sales system 122 can include order information for a specific vehicle, that is, a set of specifications and options for a vehicle, as requested through a dealership or web-based order by a customer purchasing a new vehicle after the vehicle has completed the assembly process. The vehicle sales system 122 can also provide destination information for an ordered vehicle, that is, the geographical location to which the new vehicle that is the subject of the order information will be delivered. Some options or components on the vehicle can differ depending on the delivery destination for the vehicle.

Finally, the information sources 116 can include an inventory system 124. The inventory system 124 can include comprehensive lists of components to be installed according to the build instructions for a given type of vehicle in the form of a build sheet. The inventory system 124 can also be configured to provide information regarding the supply and restocking of individual components for use on the assembly line when used in coordination with, for example, the vehicle build system 120 and the vehicle location system 118 which together provide information regarding the different sets of build instructions to follow for a full sequence of vehicles currently being assembled or planned for assembly.

The computing device 100 can also communicate with a plurality of user interfaces 126. The term "user interface" is used in this context to describe various tools that can send or receive information related to work processes associated with a vehicle on the assembly line. The user interfaces 126 are available, for example, to a worker, or user, at an assembly station. One such user interface 126 is a display 128. The display 128 can be any type of device allowing a visual representation to be presented to a worker at the assembly station in the assembly plant. Another exemplary user interface 126 is a scanning tool 130. The scanning tool 130 can be used, for example, to scan barcodes on vehicle components in order to identify the components to the computing device 100.

Another user interface 126 is an installation tool 132. The installation tool 132 can be any type of tool, such as a torque wrench or a screwdriver, used to install components onto the vehicle and configured to provide information regarding the work process by communicating with the computing device 100 when in use. Another user interface 126 is a camera 134 or other image recording device. The camera 134 can be any type of image recording device capable of capturing images and outputting signals or data indicative of those images to the CPU 102 of the computing device 100. Finally, another user interface 126 in communication with the computing device 100 can be a print tool 136. The print tool 136 can receive information from the computing device 100 and physically print a component for use in the assembly process, such as a label. The use of the various user interfaces 126 in the vehicle build information system is further described below.

Figures 2A, 2B:
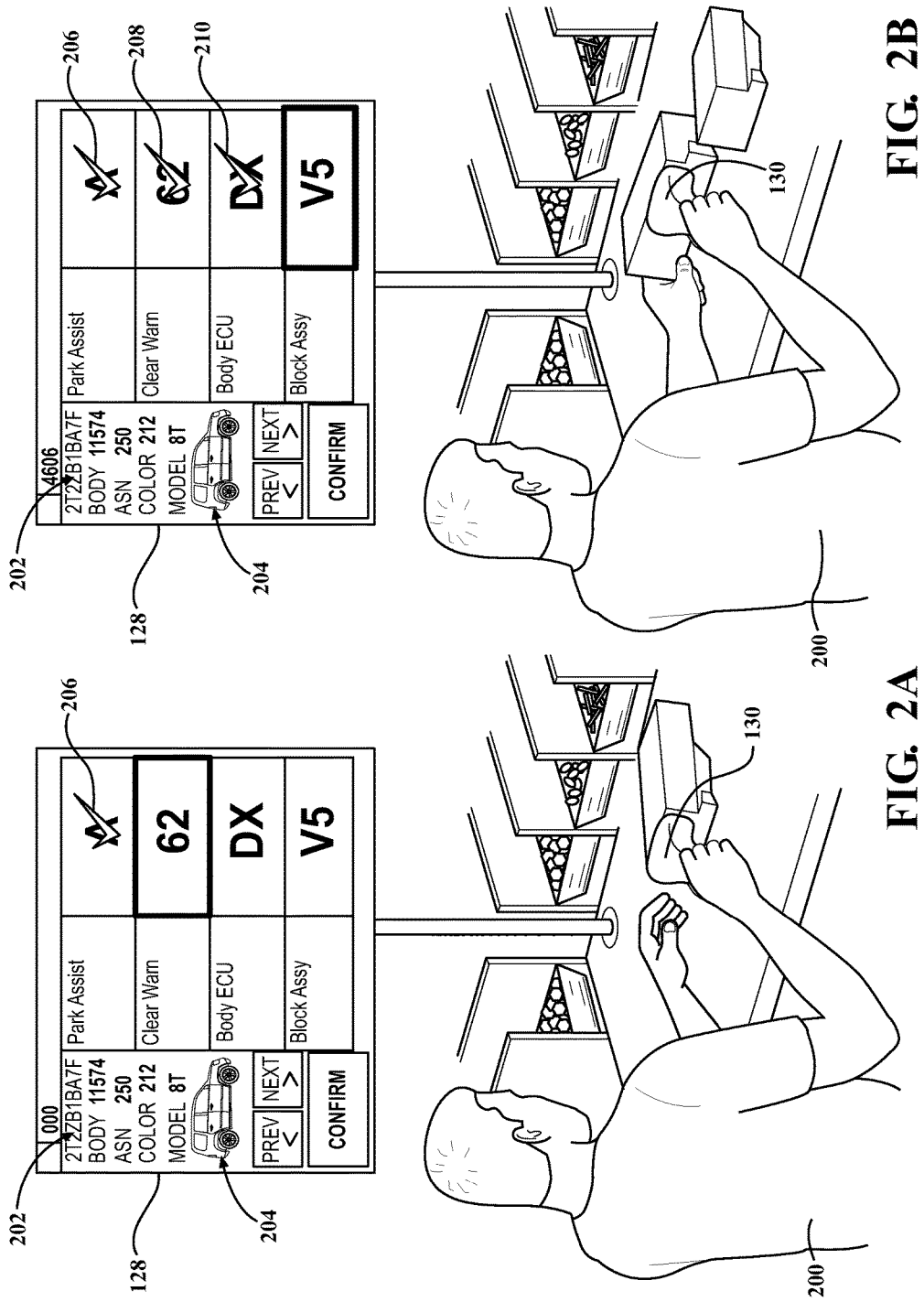

FIGS. 2A-2C show an exemplary work process represented on the display 128 according to one aspect of the vehicle build information system of FIG. 1. In this example, a worker 200 is performing a work process at an assembly station. The vehicle build information system is configured to send a visual representation guiding the work process to the display 128 located at the assembly station. The visual representation in this example includes identification information received from a first information source 116, such as the vehicle location system 118, for a vehicle being built on the assembly line. In this example, the identification information includes both a VIN 202 and a vehicle image 204 identifying the vehicle. The worker 200 at the assembly station can view the identification information on the display 128 and compare the VIN 202 and the vehicle image 204 on the display 128 to the physical vehicle proximate to the assembly station to confirm a match.

The visual representation in this example also includes build instructions received from a second information source 116, such as the vehicle build system 120, detailing the sequence of assembly for a set of four components used in a subassembly for later installation onto the vehicle. The identity of the four components can be supplied by a third information source 116, for example, by the inventory system 124, to direct installation of the four components according to the build instructions for the specific body style or type of vehicle identified by the vehicle location system 118. In FIG. 2A, the worker 200 is holding a scanning tool 130 and reading a barcode on the first component for use in building the subassembly, specifically, a "park assist" component. Once the worker 200 scans the component successfully, the computing device 100 is configured to show a check mark 206 over the component label on the visual representation of the component list shown on the display 128.

In FIG. 2B, the worker 200 has used the scanning tool 130 to sequentially scan three components according to the build instructions represented on the display 128, specifically, the "park assist" component, a "clear warn" component, and a "body ECU" component, generating three check marks 206, 208, 210 indicating success in following the build instructions. Moving to FIG. 2C, once the worker 200 scans the final component, in this example, a "block assy" component, the computing device 100 can send a completion message to the display 128. The message "vehicle confirmed successfully" 212 is shown to the worker 200, and the worker 200 can proceed with assembling the components that were scanned by the scanning tool 130. The format of the visual representation shown in the display 128 in FIGS. 2A-2C can be customized by the worker 200. For example, a variety of background colors can be associated with the various components and tied to color coding on the inventory bins from which the worker 200 selects the components for assembly.

Thus, the visual representation sent to the display 128 by the computing device 100 for use by the worker 200 in FIGS. 2A-2C includes information from three different information sources 116: the vehicle location system 118, the vehicle build system 120, and the inventory system 124. The vehicle build information system compiles information from the different information sources 116 to save the worker 200 from having to refer to each one separately to complete the work process at the assembly station. In the prior art, for example, the worker 200 would review build instructions and build sheets physically affixed to the vehicle and compare the VIN on the vehicle to a VIN provided on a display associated only with the vehicle location system 118, a time-consuming process.

Figure 3A:
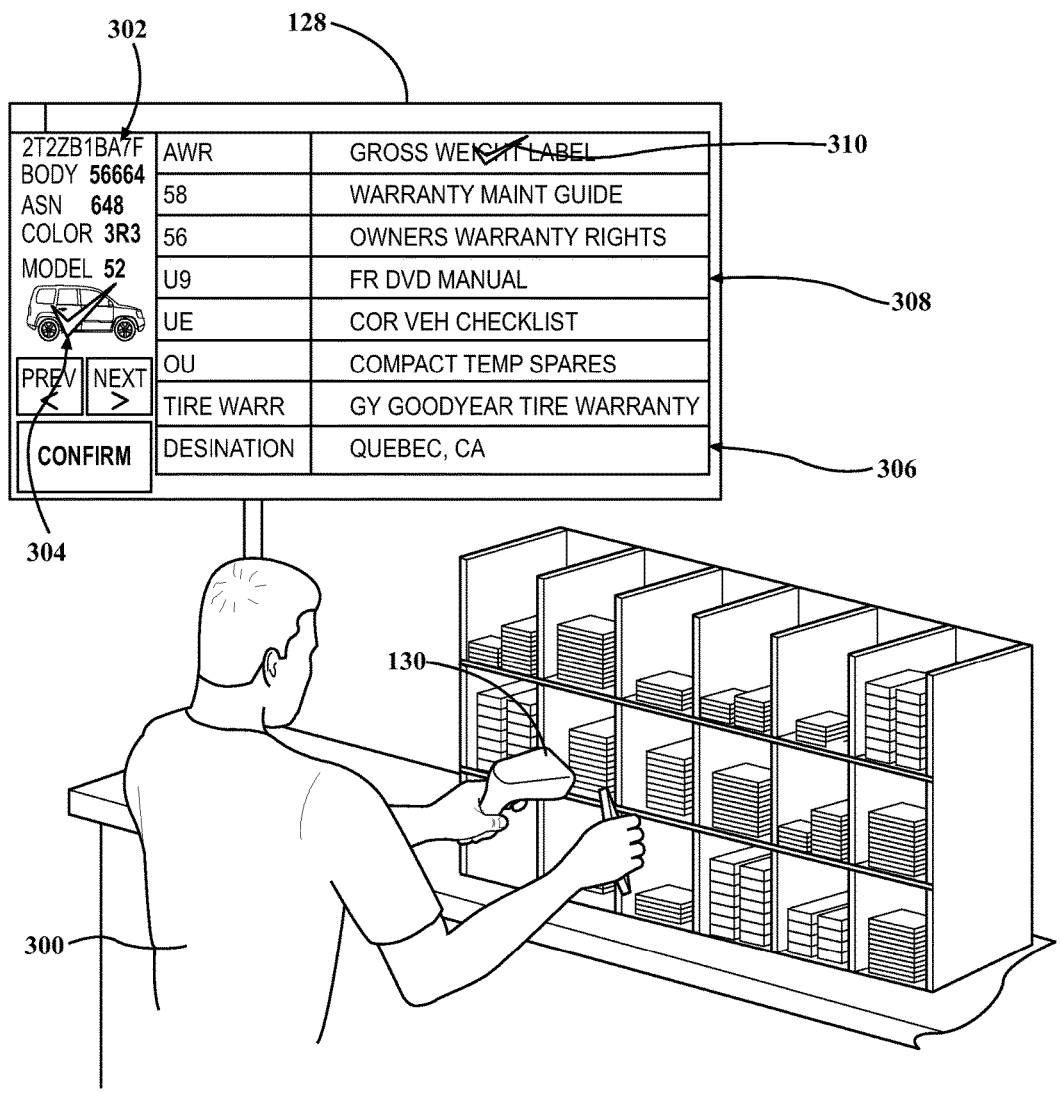
FIGS. 3A-3B show another exemplary work process represented on the display according to another aspect of the vehicle build information system of FIG. 1.
Figure 3B:
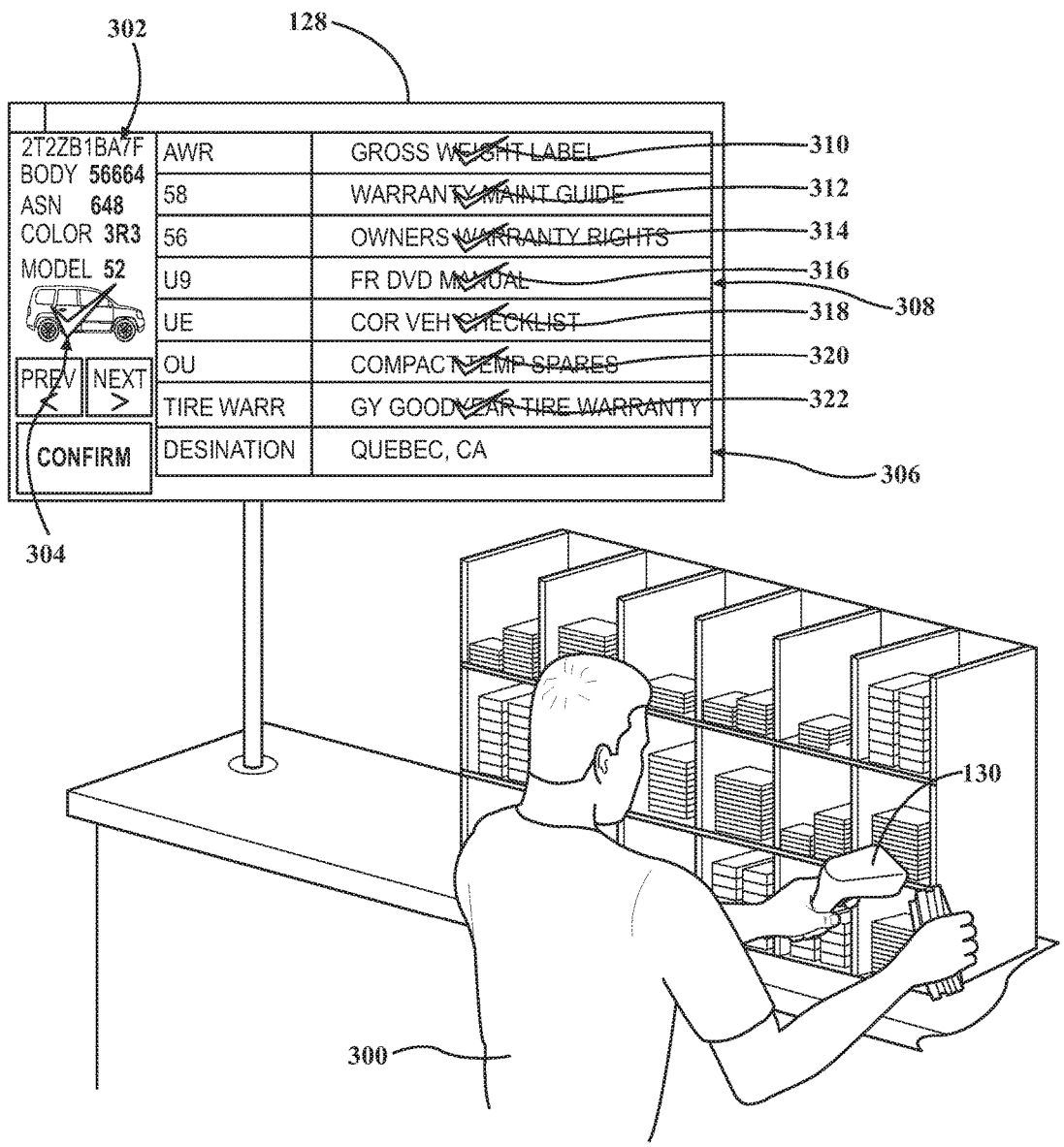

FIGS. 3A-3B show another exemplary work process represented on the display 128 according to another aspect of the vehicle build information system of FIG. 1. In this example, a worker 300 is collecting device manuals at a document station. The vehicle build information system is configured to send a visual representation guiding the work process to the display 128 located at the document station. The visual representation in this example again includes identification information received from a first information source 116, such as the vehicle location system 118, for a vehicle that was built on the assembly line and is now ready for final accessory installation. In this example, the identification information includes both a VIN 302 and a vehicle image 304 identifying the vehicle. The worker 300 at the assembly station can view the identification information on the display 128 and compare the VIN 302 and the vehicle image 304 on the display 128 to the physical vehicle proximate to the document station to confirm a match.

The visual representation in this example also includes a list of labels and manuals for inclusion in the completed vehicle compiled from information from several information sources 116, such as the vehicle build system 120, the inventory system 124, and the vehicle sales system 122. For example, the vehicle sales system 122 can provide sales order information identifying a delivery location for the vehicle where French is the spoken language, such as Quebec, Canada. This destination is shown in field 306 on the right side of the visual representation within the display 128. The inventory system 124 can also provide information that a DVD player was installed in the vehicle according to build instructions from the vehicle build system 120. Since the final destination is Quebec, and the vehicle includes a DVD player, the worker 300 can be directed by the vehicle build information system to select a DVD manual written in French, e.g. "FR DVD Manual," for inclusion in the vehicle before shipment as is shown in field 308 on the right side of the visual representation within the display 128. Thus, the inventory information identifying the components, in this case, the manuals and labels, required for compliance with the build instructions is also based on the sales order information.

In FIG. 3A, the worker 300 is holding a scanning tool 130 to read a barcode on one of the bins, specifically, the "gross weight label" bin. Once the worker 300 has scanned the bin successfully using the scanning tool 130, the computing device 100 is configured to show a check mark 310 over the component label on the visual representation of the list of labels and manuals shown on the display 128. At the same time as scanning the bin, the worker 300 can grab the "gross weight label" from the bin for inclusion with the vehicle. In FIG. 3B, the worker 300 has reached the end of the bank of bins, having used the scanning tool 130 to sequentially scan seven separate bins with labels or manuals according to the build instructions represented on the display 128 while grabbing the applicable labels or manuals from within the bins. In this example, the worker 300 has configured the vehicle build information system so as not to receive a separate confirmation message, but instead uses the presence of check marks 310, 312, 314, 316, 318, 320, 322 to confirm that all of the labels and manuals have been successfully collected for inclusion with the vehicle identified by the VIN 302 and the vehicle image 304.

Figure 4A:
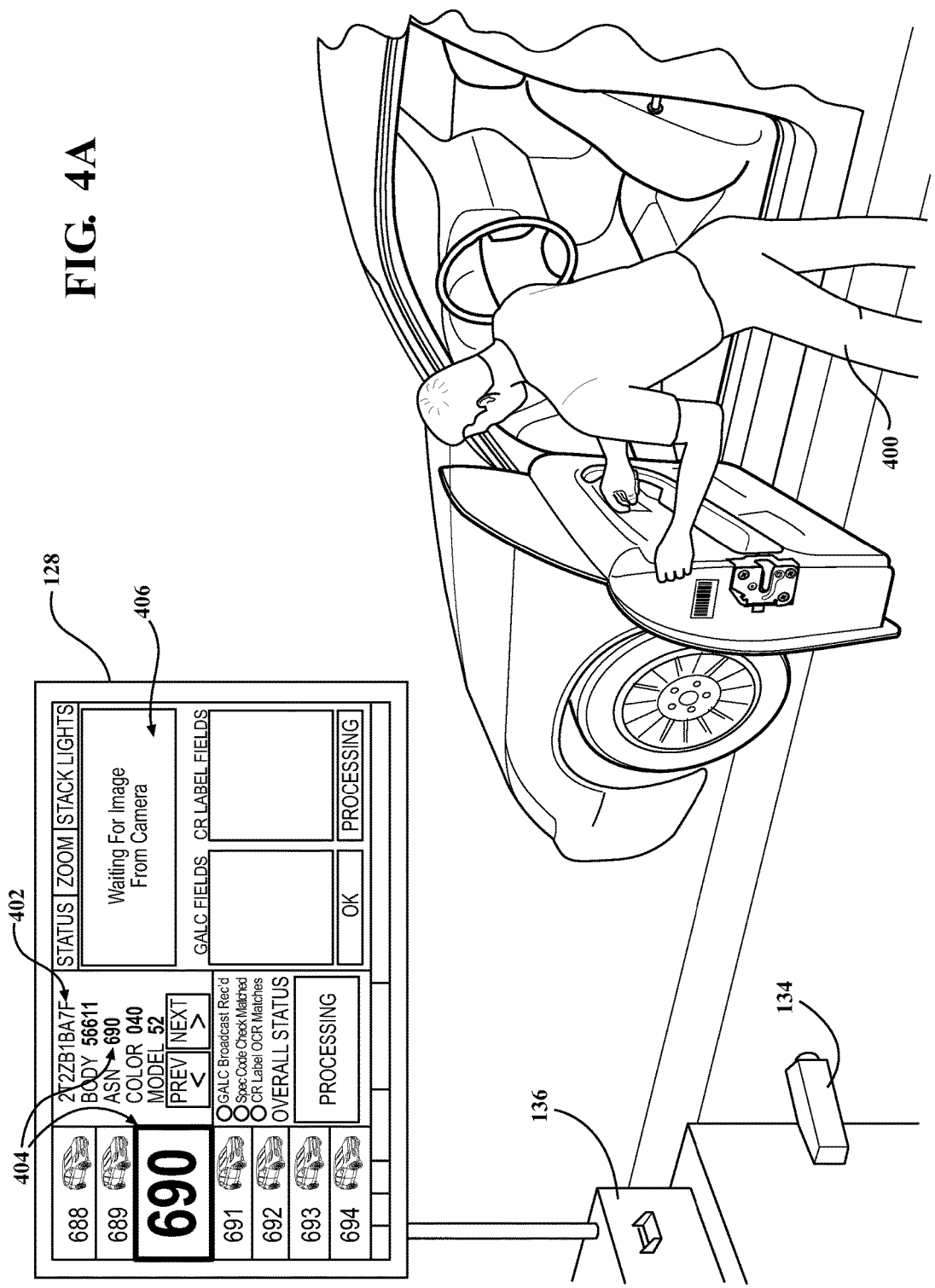
FIGS. 4A-4C show another exemplary work process represented on the display according to another aspect of the vehicle build information system of FIG. 1.
Figure 4B:
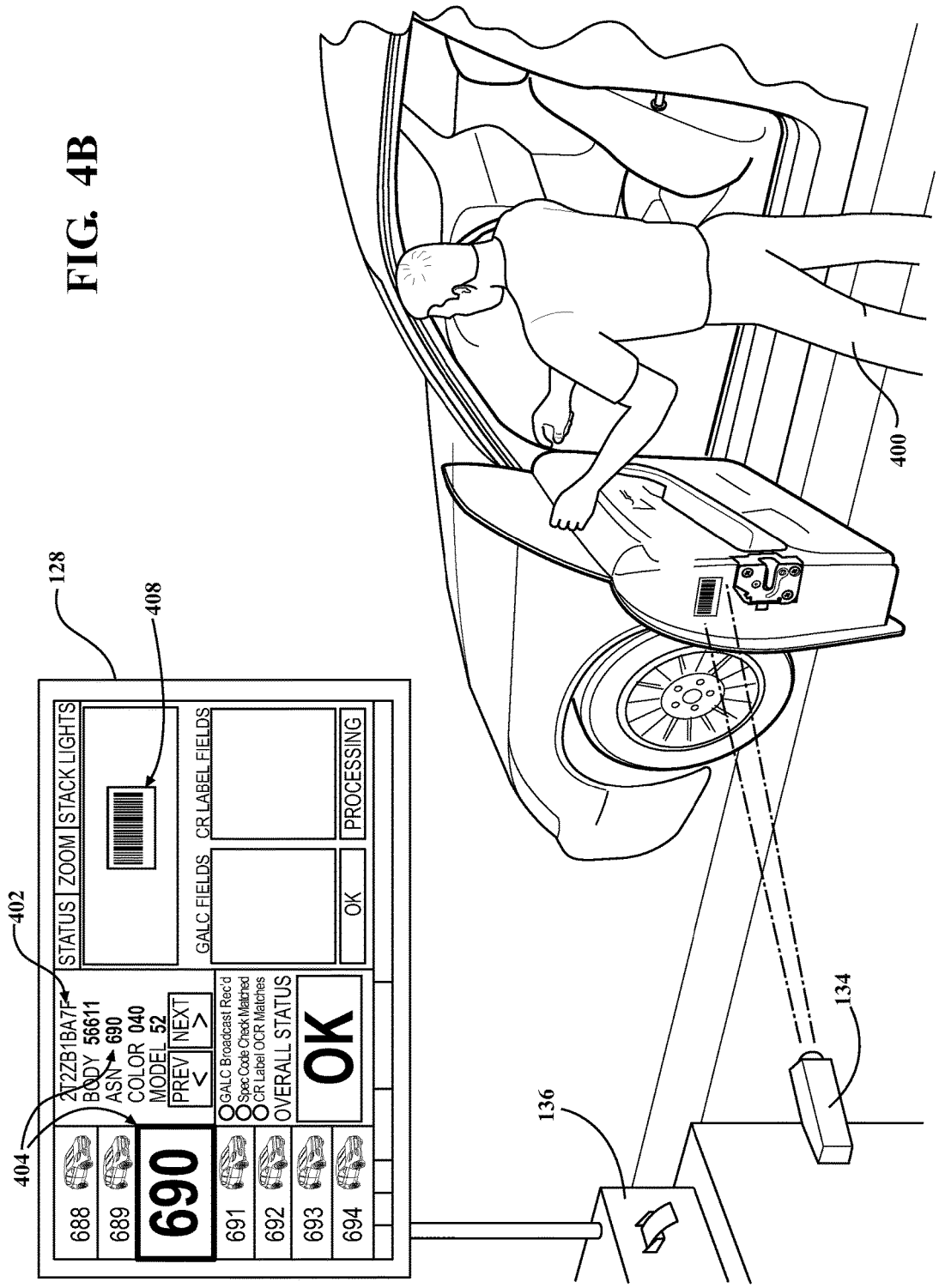
Figure 4C:
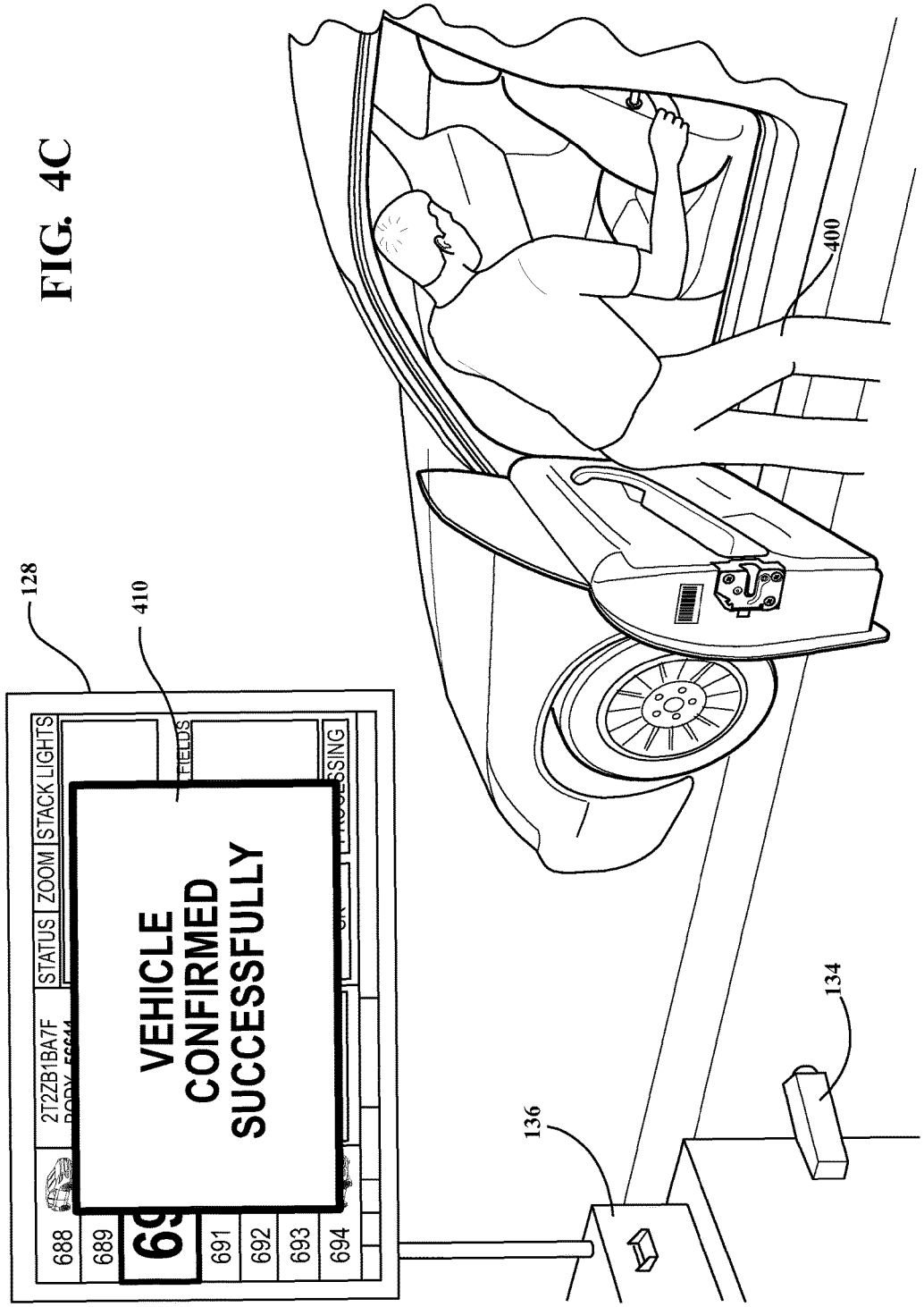

FIGS. 4A-C show another exemplary work process represented on the display 128 according to another aspect of the vehicle build information system of FIG. 1. In this example, a worker 400 installs an additional label in the frame of the door of a vehicle after the identification of the vehicle is confirmed using a camera 134 to capture a previously installed label and a print tool 136 to supply the additional label.

As shown in FIG. 4A, the worker 400 receives a visual representation guiding the work process on the display 128 located at the assembly station. The visual representation includes a VIN 402 identifying the vehicle as received from a first information source 116, such as the vehicle location system 118. Additional information is also received from the vehicle location system 118 in the form of an assembly sequence number 404, in this case, "690," identifying the vehicle within a sequence of other vehicles on the assembly line. A representation of the sequence of vehicles is shown on the left side of the display 128, with the assembly sequence number 404 in a larger font.

Based on the representation of the sequence of vehicles, the worker 400 can visually compare the vehicle currently at the assembly station, the vehicles ahead and behind the assembly station, and the displayed sequence to confirm the correct vehicle is being tracked by the vehicle build information system. The visual representation of the work process in FIG. 4A also shows a message 406 "Waiting for Image From Camera" on the right side of the display 128 to inform the worker 400 that the camera 134 has not yet captured an image of the label previously installed on the vehicle.

Moving to FIG. 4B, a label image 408 has been captured by the camera 134 and sent for display to the worker 400. The vehicle build information system can be designed, for example, to use character recognition software to compare the VIN 402 from the vehicle location system 118 to a VIN present on the label image 408 for matching purposes, that is, the label image 408 is checked for accurate vehicle identification information before another label is printed by the print tool 136 for installation on the vehicle by the worker 400 in another location.

Once the vehicle build information system finds a match between the VIN present on the label image 408 and the VIN 402 provided by the vehicle location system 118, a completion message 410 stating "Vehicle Confirmed Successfully" can also be displayed to the worker 400 as shown in FIG. 4C. After the completion message 410 is displayed, the worker 400 can grab the label from the print tool 136 and apply the label to the vehicle, as shown here, within the frame of the door. Receipt of the completion message 410 can be configured for display at the option of the worker 400. Alternatively, the worker 400 can choose to visually compare the displayed VIN 402 to the label image 408 or design the visual representation on the display 128 to show a check mark when a match is found.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle build information system, comprising:
   a user interface at an assembly station in a vehicle assembly plant for at least one vehicle; and
   a computing device in communication with the user interface, comprising:
      one or more processors for controlling operations of the computing device; and
      a memory for storing data and program instructions used by the one or more processors, wherein the one or more processors are configured to execute instructions stored in the memory to:
         receive build instructions describing at least one work process associated with the at least one vehicle, the build instructions corresponding to traditional printed build instructions;
         receive inventory information identifying a plurality of components required to comply with the build instructions, the inventory information corresponding to traditional printed build sheets; and
         operate the user interface to display a visual representation guiding the at least one work process at the assembly station, the visual representation including the build instructions and the inventory information, wherein the build instructions and the inventory information are displayed so as to be referenced together.

2. The system of claim 1, wherein the one or more processors are further configured to:
   receive location information identifying a location of the at least one vehicle among a plurality of vehicles within an assembly line along which the assembly station is positioned, wherein the visual representation further includes the location information.

3. The system of claim 1, wherein the inventory information is based on the sales order information identifying a delivery location for the at least one vehicle.

4. The system of claim 1, wherein the one or more processors are further configured to:
   permit a worker associated with performing the at least one work process to customize the visual representation.

5. The system of claim 1, wherein the build instructions and the inventory information are each received from a different information source.

6. The system of claim 1, wherein the one or more processors are further configured to:
   receive identification information for the at least one vehicle, the identification information comparable to the at least one vehicle to confirm a match; wherein:
   the visual representation further includes the identification information.

7. The system of claim 6, wherein the identification information includes at least one of a VIN of the at least one vehicle and an image of the at least one vehicle.

8. A vehicle build information management method, comprising:
   receiving build instructions describing at least one work process associated with at least one vehicle, the build instructions corresponding to traditional printed build instructions;
   receiving inventory information identifying a plurality of components required to comply with the build instructions, the inventory information corresponding to traditional printed build sheets; and
   operating a user interface at an assembly station in a vehicle assembly plant for the at least one vehicle to display a visual representation guiding the at least one work process at the assembly station, the visual representation including the build instructions and the inventory information, wherein the build instructions and the inventory information are displayed so as to be referenced together.

9. The method of claim 8, further comprising:
   receiving location information identifying a location of the at least one vehicle among a plurality of vehicles within an assembly line along which the assembly station is positioned, wherein the visual representation further includes the location information.

10. The method of claim 8, wherein the inventory information is based on sales order information identifying a delivery location for the at least one vehicle.

11. The method of claim 8, wherein the build instructions and the inventory information are each received from a different information source.

12. The method of claim 8, further comprising:
receiving identification information for the at least one vehicle, the identification information comparable to the at least one vehicle to confirm a match; wherein:
the visual representation further includes the identification information.

13. The method of claim 12, wherein the identification information includes at least one of a VIN of the at least one vehicle and an image of the at least one vehicle.

14. A computing device, comprising:
one or more processors for controlling operations of the computing device; and
a memory for storing data and program instructions used by the one or more processors, wherein the one or more processors are configured to execute instructions stored in the memory to:
receive build instructions describing at least one work process associated with at least one vehicle, the build instructions corresponding to traditional printed build instructions;
receive inventory information identifying a plurality of components required to comply with the build instructions, the inventory information corresponding to traditional printed build sheets; and
send for display, to a user interface at an assembly station in a vehicle assembly plant for the at least one vehicle, a visual representation guiding the at least one work process at the assembly station, the visual representation including the build instructions and the inventory information, whereby the build instructions and the inventory information are displayed so as to be referenced together.

15. The computing device of claim 14, wherein the one or more processors are further configured to:
receive location information identifying a location of the at least one vehicle among a plurality of vehicles within an assembly line along which the assembly station is positioned, wherein the visual representation further includes the location information.

16. The computing device of claim 14, wherein the inventory information is based on sales order information identifying a delivery location for the at least one vehicle.

17. The computing device of claim 14, wherein the build instructions and the inventory information are each received from a different information source.

18. The computing device of claim 14, wherein the one or more processors are further configured to:
receive identification information for the at least one vehicle, the identification information comparable to the at least one vehicle to confirm a match; wherein:
the visual representation further includes the identification information.

19. The computing device of claim 18, wherein the identification information includes at least one of a VIN of the at least one vehicle and an image of the at least one vehicle.

20. The computing device of claim 14, wherein the one or more processors are further configured to:
permit a worker associated with performing the at least one work process to customize the visual representation.

* * * * *

UNITED STATES PATENT AND TRADEMARK OFFICE
CERTIFICATE OF CORRECTION

| | | |
|---|---|---|
| PATENT NO. | : 9,823,649 B2 | Page 1 of 1 |
| APPLICATION NO. | : 14/633474 | |
| DATED | : November 21, 2017 | |
| INVENTOR(S) | : Ricky V. Sahadeo et al. | |

It is certified that error appears in the above-identified patent and that said Letters Patent is hereby corrected as shown below:

At Column 8, Line 18 in Claim 3: replace "based on the sales order" with --based on sales order--

Signed and Sealed this
Twenty-fourth Day of April, 2018

Andrei Iancu
*Director of the United States Patent and Trademark Office*